United States Patent
Li et al.

(10) Patent No.: US 12,481,644 B2
(45) Date of Patent: Nov. 25, 2025

(54) DYNAMICALLY DEPLOYING EXECUTION NODES USING SYSTEM THROUGHPUT

(71) Applicant: International Business Machines Corporation, Armonk, NY (US)

(72) Inventors: Shuo Li, Beijing (CN); Xiaobo Wang, Beijing (CN); Xin Peng Liu, Beijing (CN); Yue Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 17/014,467

(22) Filed: Sep. 8, 2020

(65) Prior Publication Data
US 2022/0075771 A1  Mar. 10, 2022

(51) Int. Cl.
*G06F 16/23* (2019.01)
*G06F 9/48* (2006.01)

(52) U.S. Cl.
CPC ........ *G06F 16/2379* (2019.01); *G06F 9/4843* (2013.01)

(58) Field of Classification Search
CPC ............................. G06F 16/2379; G06F 9/4843
USPC ......................................................... 707/756
See application file for complete search history.

(56) References Cited

U.S. PATENT DOCUMENTS

| | | | | |
|---|---|---|---|---|
| 5,561,778 A | * | 10/1996 | Fecteau | G06F 12/109 |
| | | | | 711/144 |
| 5,758,357 A | * | 5/1998 | Barry | G06F 16/284 |
| 6,317,818 B1 | * | 11/2001 | Zwiegincew | G06F 12/08 |
| | | | | 711/213 |
| 6,385,626 B1 | * | 5/2002 | Tamer | G06F 11/1451 |
| | | | | 707/999.203 |
| 6,757,670 B1 | * | 6/2004 | Inohara | G06F 16/24542 |
| | | | | 707/999.005 |
| 8,402,469 B2 | | 3/2013 | Bose et al. | |

(Continued)

OTHER PUBLICATIONS

Pridviraju et al., "Exploiting Dynamic Resource Allocation for Query Processing in the Cloud Computing," (IJCSIT) International Journal of Computer Science and Information Technologies, vol. 3 (5) , 2012, pp. 5206-5209, http://ijcsit.com/docs/Volume%203/vol3issue5/ijcsit2012030554.pdf.

(Continued)

*Primary Examiner* — Mark E Hershley
*Assistant Examiner* — Antonio J Caiado
(74) *Attorney, Agent, or Firm* — Stosch Sabo

(57) ABSTRACT

A method, system, and computer program product for using logical segments to help manage database tasks and performance for SQL parallelism. The method may include identifying a database object within a database resource of a database. The method may further include determining a database access method for the database object. The method may further include dividing data within the database object into a plurality of logical segments based on the database access method. The method may further include receiving a query for the database. The method may further include identifying the database object that corresponds to the query. The method may further include analyzing the logical segments of the database object. The method may further include distributing access to the database resource based on the logical segments of the database object.

15 Claims, 10 Drawing Sheets

(56) References Cited

U.S. PATENT DOCUMENTS

| | | | | |
|---|---|---|---|---|
| 8,527,544 | B1* | 9/2013 | Colgrove | G06F 3/0641 |
| | | | | 707/791 |
| 9,251,067 | B1* | 2/2016 | Tomlin | G06F 12/10 |
| 9,298,768 | B2 | 3/2016 | Varakin et al. | |
| 9,424,155 | B1* | 8/2016 | Pizel | G06F 3/0619 |
| 2003/0088572 | A1* | 5/2003 | Smith | G06F 16/282 |
| 2003/0149683 | A1* | 8/2003 | Lee | G06F 16/25 |
| 2003/0163635 | A1* | 8/2003 | Aasheim | G06F 11/1474 |
| | | | | 711/E12.008 |
| 2006/0020580 | A1* | 1/2006 | Dettinger | G06F 16/284 |
| 2006/0212658 | A1* | 9/2006 | Hrle | G06F 12/0862 |
| | | | | 711/137 |
| 2006/0218123 | A1* | 9/2006 | Chowdhuri | G06F 16/24532 |
| 2008/0052265 | A1* | 2/2008 | Vos | G06F 16/2453 |
| 2008/0077586 | A1* | 3/2008 | Lam | G06F 16/174 |
| 2008/0177975 | A1* | 7/2008 | Kawamura | G06F 16/2282 |
| | | | | 711/E12.002 |
| 2008/0208668 | A1* | 8/2008 | Heller | G06Q 30/02 |
| | | | | 705/7.12 |
| 2009/0157742 | A1* | 6/2009 | Anderson | G06F 9/5016 |
| 2009/0320019 | A1* | 12/2009 | Ellington | G06F 8/71 |
| | | | | 717/177 |
| 2011/0072194 | A1* | 3/2011 | Forhan | G06F 12/0246 |
| | | | | 711/170 |
| 2011/0302151 | A1* | 12/2011 | Abadi | G06F 16/2456 |
| | | | | 707/E17.017 |
| 2012/0047158 | A1* | 2/2012 | Lee | G06F 16/24545 |
| | | | | 707/759 |
| 2013/0226901 | A1* | 8/2013 | Dettinger | G06F 16/2428 |
| | | | | 707/714 |
| 2014/0279840 | A1* | 9/2014 | Chan | G06F 16/22 |
| | | | | 707/607 |
| 2015/0039559 | A1* | 2/2015 | Bhattacharjee | G06F 16/219 |
| | | | | 707/625 |
| 2015/0370651 | A1* | 12/2015 | Gaza | G06F 11/1464 |
| | | | | 707/652 |
| 2016/0210342 | A1* | 7/2016 | Vallabhaneni | G06F 11/14 |
| 2016/0325755 | A1* | 11/2016 | Ricci | G08B 21/18 |
| 2016/0342653 | A1* | 11/2016 | Chen | G06F 16/24556 |
| 2016/0371021 | A1* | 12/2016 | Goldberg | G06F 3/065 |
| 2016/0371332 | A1* | 12/2016 | Li | G06F 16/24554 |
| 2016/0378669 | A1* | 12/2016 | Li | G06F 8/4442 |
| | | | | 711/137 |
| 2017/0039218 | A1* | 2/2017 | Prahlad | G06Q 30/0206 |
| 2017/0220586 | A1* | 8/2017 | Zuckerman | G06F 16/2246 |
| 2017/0371909 | A1* | 12/2017 | Andrei | G06F 16/21 |
| 2018/0004783 | A1* | 1/2018 | Mehrotra | G06F 16/252 |
| 2019/0163787 | A1* | 5/2019 | Andrews | G06F 16/35 |
| 2019/0339894 | A1* | 11/2019 | Bensberg | G06F 3/0604 |
| 2020/0150137 | A1* | 5/2020 | Day | G01N 35/00722 |
| 2022/0083515 | A1* | 3/2022 | Yoon | G06F 16/156 |
| 2022/0091769 | A1* | 3/2022 | Hu | G06F 11/1076 |

OTHER PUBLICATIONS

Oduol, "Efficient parallel data processing from Cloud Datastore on Google App Engine," Feb. 14, 2018, 5 pages, https://medium.com/@jakq/processing-data-in-parallel-from-cloud-datastore-on-google-appengine-1a112c28e432.

"Method for data and resource partition in parallel computing systems," IP.Com, An IP.com Prior Art Database Technical Disclosure, IP.com No. IPCOM000252255D, IP.com Electronic Publication Date: Jan. 2, 2018, 5 pages, https://priorart.ip.com/IPCOM/000252255.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

DYNAMICALLY DEPLOYING EXECUTION NODES USING SYSTEM THROUGHPUT

BACKGROUND

The present disclosure relates to database management systems and, more specifically, to using logical segments to help manage database tasks and performance for SQL server parallelism.

A database management system (DBMS) includes software that interacts with databases and the various components communicating with them. The DBMS may be used to create, manage, and control access to a database. There are various database languages (such as a data control language (DCL), data manipulation language (DML), data definition language (DDL), and data query language (DQL)) that may be used for the creating, managing, and controlling of the database. In some instances, a domain-specific language—structured query language (SQL)—may be used.

SUMMARY

The present invention provides a computer-implemented method, system, and computer program product to use logical segments to help manage database tasks and performance for SQL server parallelism. The method may include identifying a database object within a database resource of a database. The method may further include determining a database access method for the database object. The method may further include dividing data within the database object into a plurality of logical segments based on the database access method. The method may further include receiving a query for the database. The method may further include identifying the database object that corresponds to the query. The method may further include analyzing the logical segments of the database object. The method may further include distributing access to the database resource based on the logical segments of the database object. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
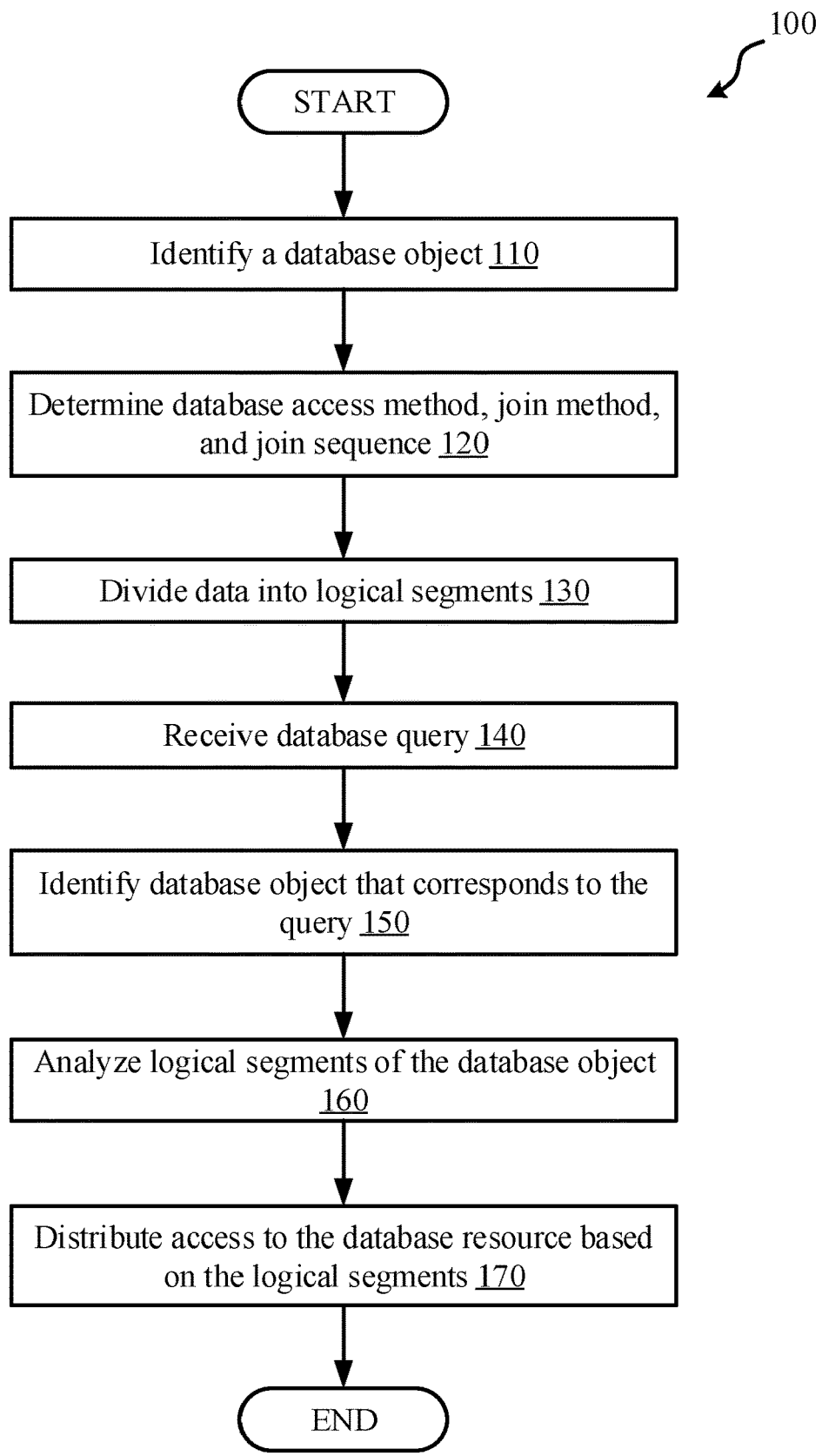
FIG. 1 depicts a flowchart of a set of operations for distributing access to a database resource based on logical segments, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to database management systems and, more specifically, to using logical segments to help manage database tasks and performance for SQL parallelism. While the present disclosure is not necessarily limited to such applications, various aspects of the disclosure may be appreciated through a discussion of various examples using this context.

Database resources (such as a processor, CPU, memory, etc.) may be used to execute tasks and queries for a database. However, each database resource may have certain throughput capabilities and limitations. Throughput, as referred to herein, may be a processing rate such as an amount of tasks completed or executed per time. A database resource may only be capable of executing a certain number of tasks at a time. When executing tasks and queries using SQL, parallelism may be used in order to increase database performance. Parallelism, or parallel processing, may execute multiple processes on multiple SQL servers at the same time (i.e., simultaneously). This may increase database performance, as multiple servers are being used, resulting in an increased amount of available throughput for processing. However, the database resource (e.g., processor, memory, etc.) may also become overloaded and/or run down. Each server may correspond to a system resource, and if multiple SQL servers are being run in parallel that correspond to the same system resource, the system resource may need to use significantly more bandwidth than would have been necessary if only one SQL server was being utilized. Further, if multiple SQL servers are being used to perform one task, the performance of those SQL servers for the specific task may be improved (as multiple SQL servers are being used), but the performance of SQL servers performing other tasks may be significantly reduced as the necessary system resource may be significantly occupied by the SQL servers performing the specific task via parallelism (i.e., the throughput may be primarily used by those servers). The other SQL servers may have to wait until throughput is available.

The present disclosure provides a computer-implemented method, system, and computer program product to use logical segments to help manage database tasks and performance for SQL server parallelism. A database may have multiple resources (referred to herein as database resources), such as a processor (e.g., CPU), memory, other storage components, and/or any other components utilized when executing tasks. When a query is submitted by a user, the database (for instance, using SQL) is instructed to perform one or more tasks in order to execute the query. These tasks may correspond to database resources. For example, if the submitted query includes a request for data stored in the database, one or more of the tasks may be to obtain the data from the memory. The memory is the database resource, in this example. However, as discussed herein, each resource may have a limited amount of bandwidth and/or throughput. When executing SQL parallelism, in conventional database management systems, the processing may be accelerated (due to the multiple SQL servers being utilized) but the storage and other database resources may be used up and, in some instances, overloaded.

To dynamically coordinate and preserve the throughput of the database resource(s), logical segments may be used. In some instances, the data corresponding to each database resource may be stored, or held, in a database object. A database object may be anything used to store or reference data, such as a table, a sequence, an index, a view, etc. When a database query is being processed, the database management system (DBMS) may access one or more database objects in order to obtain the necessary data for the query. To prevent database resource bandwidth from being used up and/or overloaded, the database objects may be divided into a plurality of logical segments. A logical segment, as referred to herein, is a small piece of the data within the database object. These small pieces, or logical segments, are determined using various methods depending on the access method, join method, and/or join sequence of the database.

Referring now to FIG. 1, a flowchart illustrating a method 100 for distributing access to a database resource based on logical segments is depicted, according to some embodiments. In some embodiments, method 100 is executed by a server (e.g., computer system/server 802 (FIG. 8)) on or connected to a computer system (e.g., computer system 800 (FIG. 8)). In some embodiments, the method 100 is implemented as a computer script or computer program (e.g., computer executable code) to be executed on or connected to the computer system. In some embodiments, the method 100 is implemented as a computer script or computer program (e.g., computer executable code) to be executed on or connected to a central coordinator (e.g., central coordinator 330 (FIG. 3) and/or central coordinator 430 (FIG. 4)) that is on or connected to a database management system (e.g., database management system environment 300 (FIG. 3) and/or 400 (FIG. 4)). In some embodiments, method 100 is executed on a central coordinator, device, and/or computer system within a cloud computing environment (e.g., cloud computing environment 50 (FIG. 9)).

Method 100 includes operation 110 to identify a database object within a database resource of a database. A database includes multiple components that make up said database, including the memory (e.g., Random Access Memory (RAM)), the processor (e.g., Central Processing Unit (CPU)), other storage components (e.g., disk storage), etc. These components may be referred to herein as the database resources. Further, each database resource may include database object(s) that store and/or reference the data (on each database resource), such as a table, a sequence, an index, a view, etc. Identifying a database object may include analyzing the database, identifying the database resources within the database, and then identifying the database objects for each resource. In some instances, the database objects are analyzed.

Method 100 includes operation 120 to determine a database access method, join method, and join sequence for the database. Database access methods are methods used to process queries and access data. As discussed herein, the data may be contained within database objects. In some instances, the database access method may be dependent on the type of database object that contains the data. For instance, if the database object is an index, the database access method may be an index scan, in which the index pages are scanned to find the appropriate data. In some instances, if the database object is a table, the database access method may be a table scan or workfile scan, in which the tables (or workfiles) are scanned to find the appropriate data. In some instances, the database access method may be a "sorting" method. The sorting access method may sort, or filter, the data in order to find the appropriate data.

A database join method may be used when data is retrieved from multiple database objects (for example, multiple tables). Some example join methods may include nest loop join, sort merge join, hash join, etc. In some instances, a nest loop join method may be used to join database objects when one inner database object is dependent on an outer database object. For example, a small inner table may be dependent on an outer table. A sort merge join, in some instances, may be used to join independent data sets, or independent database objects. In some instances, a hash join may be used when larger data sets, or larger database objects are being joined.

A database join sequence may indicate the order that the database objects are being joined together. The join sequence may start with the leading database object (e.g., leading table), in some embodiments. In some instances, when using SQL, the DBMS and/or SQL server may automatically determine the leading database object and the join sequence. In some embodiments, the join sequence may be manually determined. Database access methods, join methods, and join sequences are discussed further herein.

Method 100 includes operation 130 to divide the data into logical segments. Once the database access method(s), join method(s), and join sequence(s) are determined for each database object, at least one of the access method, join method, and join sequence may be used to divide the data (within the database object) into a plurality of logical segments (or a plurality of small sections of data). By breaking down the data within the database object into a plurality of logical segments, a database query may only need to process a single logical segment at a time (for instance, in order to retrieve, create, delete, etc. the data), instead of needing to access the entire database object. This may help to dynamically allocate database access to help increase efficiency and maintain throughput of the database and database object. Logical segments may be a minimum work unit of data (for example, records and/or index keys) processed by a parallel sub-task. For example, each leaf page may be a logical segment, as each leaf may be processed by one sub-task. In some instances, a bundle of leaf pages may be considered a logical segment for a sub-task process. In another example, a range of data pages that are managed by one space map page may be a logical segment, as one sub-task is responsible for processing all the data managed by the space map page.

Dividing the data into logical segments may be dependent on the access method, join method, and/or the join sequence. Dividing the data for each of the different access methods, join methods, and join sequences may be discussed further herein and depicted in FIG. 2.

Method 100 includes operation 140 to receive a database query from a user. A database query, as referred to herein, may be a request to retrieve and/or manipulate (e.g., create, read, update, delete, etc.) data. In some instances, the database query corresponds to specific data stored on the database. The specific data may be stored on one of the database resources and, more specifically, on a database object of the database resource.

Method 100 includes operation 150 to identify a database object that corresponds to the query. As discussed above, the specific query may correspond to specific data stored on the database. For example, a query about the weather may only correspond to weather related data, it may not correspond to data relating to food, for instance. In some embodiments, identifying the database object includes determining which database object, or objects, include the specific data necessary for the query.

Method 100 includes operation 160 to analyze the logical segments of the database object. Analyzing the logical segments may include identifying the logical segments of the specific database object and determining which specific tasks of the query may correspond to each logical segment. Tasks of the query may be the various tasks needed in order to execute the database query. For instance, if a query includes a question, one task may include determining which data is needed to answer the query and a second task may be to obtain the actual data from the cache and/or memory. For example, a database object may be broken down into thirty logical segments. In this example, three parallel tasks may be available to help execute the query. Therefore, in this example, each parallel task may process ten of the logical segments. For example, the tasks may alternate, for each logical segment, which task is doing the processing.

Method 100 includes operation 170 to distribute, to the tasks, access to the database resource based on the logical segments. In some instances, the database management system is concurrently executing a plurality of queries for the database. Each of these queries may correspond to various database resources. However, as discussed herein, the resources have limited bandwidth and throughput. Because of the limited bandwidth and throughput, tasks may be prevented from accessing the necessary resources (for instance, if they are already being accessed) unless access to the resources is redistributed. Therefore, the access to these resources may be dynamically distributed in order to increase efficiency and prevent overuse of the resources (for example, using up the available bandwidth).

In some embodiments, distributing access to the database resource based on the logical segments of the database object includes creating a logical segment task map for the database object. A logical segment task map may show each logical segment for the database object, the task that is scheduled to process the logical segment, and whether or not the logical segment has been processed. Put more generally, the logical segment task map may show the relationship between each logical segment and the tasks allocated to the database object.

In some embodiments, distributing access to the database resource includes tracking, using the logical segment task map, tasks for the database object and their corresponding logical segments. Tracking the tasks for the database object may include determining which logical segments have been processed and by which task and determining which logical segments have been processed and are currently being processed. In some embodiments, distributing access to the database resource includes determining whether a first logical segment (from the logical segments) is currently being processed. In some embodiments, a logical segment may be in the middle of being processed. If this is the case, the access to the database resources may not be able to be redistributed until the processing for the specific logical segment is finished. However, as logical segments are small, the processing time for a logical segment may not be very long.

In some instances, (for instance, when the logical segment is in the middle of being processed) it may be determined that the first logical segment is currently being processed. If it is determined that the first logical segment is currently being processed, distributing access to the database resource may further include waiting for the first logical segment to finish processing, stopping subsequent second logical segments from being processed, granting the request for the database resource, and updating the logical segment task map.

In some instances, it may be determined that the first logical segment is not being processed. If it is determined that the first logical segment is not being processed, distributing access to the database resource may include processing the received query and updating the logical segment task map. If a logical segment is not currently being processed, then it may not be necessary to wait until processing is over before distributing access to the database resource such that the received query can be executed.

Figure 2:
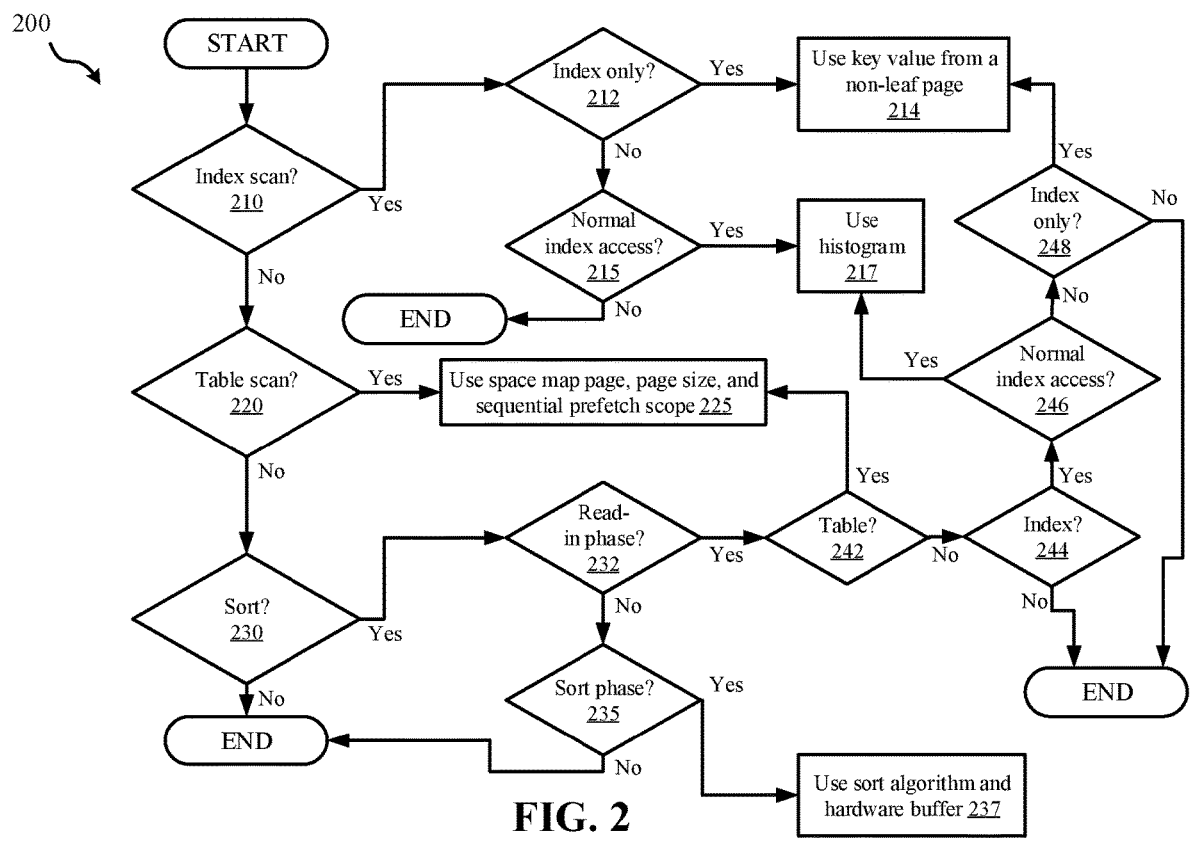
FIG. 2 depicts a flowchart of a set of operations for determining logical segments, according to some embodiments.

Referring to FIG. 2, a flowchart illustrating a method 200 for determining logical segments is depicted, according to some embodiments. As discussed herein, the method of determining logical segments may vary depending on the database access method, join method, and/or join sequence. Method 200 depicts different ways of dividing into logical segments based on the different access methods, in some embodiments.

Method 200 includes operation 210 to determine whether the access method is an index scan. In some instances, determining whether the access method is an index scan may include determining whether the database object is an index. If the database object is an index, the access method may be an index scan. If it is determined, in operation 210, that the access method is an index scan, method 200 may proceed to operation 212 to determine whether the index scan includes index only access. Index only access may limit the database object access to only the index itself, and may prevent access to the corresponding data pages, in some instances. If it is determined in block 212 that the index scan access method includes index only access, the method proceeds to operation 214. In operation 214 then dividing the data within the database object into logical segments (e.g., operation 130, FIG. 1) may be based on key-values from a non-leaf page (for instance, non-leaf keys). In some instances, a key is a name of an item of data and the value is the content of the data. For example, there may be three parallel tasks that correspond to a key range of 90 to 190, 191 to 290, and 291 to 390, respectively. There may be key-values from the non-leaf page of 81, 96, 113, and 400, in this example. Based on the key-values, the key range(s) may be divided into logical segments of 25 to 80, 81 to 95, 96 to 112, 113 to 128, and so on, until a logical segment of 400 and up. In this example, there may be at least 5 logical segments, compared to the three initial ranges. If a query would have been processed based on the three initial ranges, then the system would have to wait until the entire range of 90 to 190 was finished processing before considering any redistribution of database resource access. By using the example logical segments, the system may only need to wait for a logical segment for a range of 96 to 112 to finish processing before redistributing the access to the resources. This may result in much quicker redistribution, compared to conventional methods.

In some instances, it may be determined in operation 212 that an index scan access method does not have index only access. In this instance, method 200 may proceed to operation 215 to determine whether the index scan has normal index access. Normal index access may grant access to both the index and its corresponding data pages, in some instances. If it is determined that the index scan does not have normal index access in operation 215, method 200 may end. If it is determined that the index scan does have normal index access in operation 215, method 200 may proceed to operation 217 and may use a histogram to divide the data into the plurality of logical segments. Dividing data into a plurality of logical segments when an index scan has normal index access is discussed further herein and depicted in FIG. 5.

If it is determined, in operation 210, that the access method is not an index scan, method 200 may proceed to operation 220 to determine whether the access method is a table scan. In some instances, determining whether the access method is a table scan may include determining whether the database object is a table. If the database object is a table, the access method may be a table scan. If it is determined, in operation 220, that the access method is a table scan, then the space map page, page size, and sequential prefetch scope of the table may be used to divide the data into logical segments (operation 225). In some instances, a space map page is a page that exists in both a table space and an index. A page size may be the size of a single page in a database table. The sequential prefetch scope may be an amount of pages that can be read before they are actually required by an application (for example, when processing a database query). Dividing the data into logical segments based on the space map page, page size, and sequential prefetch scope may be further discussed herein and depicted in FIG. 6.

If it is determined, in operation 220, that the access method is not a table scan, method 200 may proceed to operation 230 to determine whether the access method is "sort." If it is determined, in operation 230, that the access method is not a sort, then method 200 may end. If, on the other hand, it is determined that the access method is a sort, then method 200 may proceed to operation 232 to determine whether the sort access method is on the read-in phase. A sort access method may sort, or filter, the data. The read-in phase of the sort algorithm may include simply reading the data to be sorted. When the sort access method is in the read-in phase, the logical segments may be determined using the key-value from a non-leaf page in operation 214, a histogram in operation 217, and/or the space map page, page size, and sequential prefetch scope in operation 225. In some instances, this may be determined based on whether the data to be read (in the read-in phase) is stored in a table (in operation 242) and/or an index (in operation 244). In some embodiments, if the data to be read is stored in a table (determined in operation 242), operation 225 may be used to determine the logical segments. If the data is not to be stored in a table or in an index (determined in operation 244), method 200 may end. However, if the data to be read is stored in an index (determined in operation 244), operation 214 and/or 217 may be used to determine the logical segments, depending on the index access. If there is normal access (in operation 246), operation 217 may be used, and if there is index only access (in operation 248), operation 214 may be used. If there is not normal index access or index only access (determined in operation 248), method 200 may end.

In some embodiments, it may be determined that the sort access method is not in a read-in phase (in operation 232). If this is the case, method 200 may proceed to operation 235 to determine whether the sort access method is in a sort phase. If the sort access method is not in a sort phase (in operation 235), method 200 may end. If it is determined that the sort access method is in the sort phase (235), dividing the data into the logical segments may be done using a sort algorithm and a hardware buffer (237).

Figure 3:
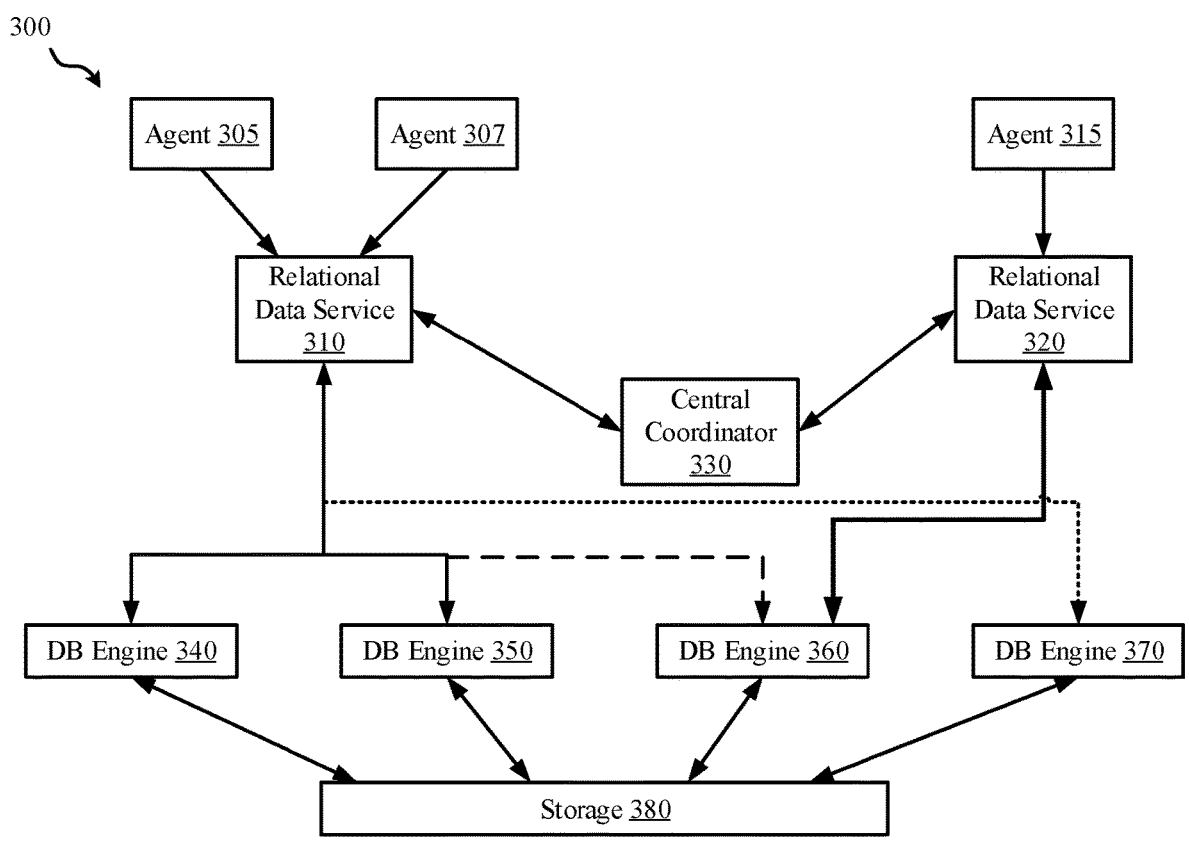
FIG. 3 depicts a schematic diagram of a first example database management system environment, according to some embodiments.

Referring to FIG. 3, a schematic diagram of a first example database management system (DBMS) environment 300 is depicted, according to some embodiments. In some instances, DBMS environment 300 includes three agents 305, 307, and 315. When an application accesses a database, for instance in response to a query submitted by a user, various threads (i.e., programmed instructions) may be used to perform the various application tasks. The agents 305, 307, and 315 may each correspond to a thread. For instance, after a database query is received, various application tasks may be created in order to execute the query, and each task and its corresponding thread may be represented by the agents 305, 307, and 315. In some instances, DBMS environment 300 may include relational database services (RDSs) 310 and 320 to help execute the tasks. In DBMS environment 300, both agents 305 and 307 utilize RDS 310, while agent 315 utilizes RDS 320.

The DBMS environment 300 also includes a central coordinator 330. In some embodiments, central coordinator 330 may execute methods 100 and 200 (FIGS. 1 and 2, respectively). The central coordinator 330 may create and manage all of the logical segments and their use. In some instances, the central coordinator 330 may initially grant RDS 310 access to database (DB) engines 340, 350, and 360. The DB engines may be the software component that grants access to storage 380, in some instances. Therefore, the RDS 310 (and the corresponding agents 305 and 307) may access data from storage 380 through DB engines 340, 350, and 360 (initially). In an example embodiment, agent 305 may be the initial agent to access RDS 310 and DB engines 340, 350, and 360. In this example, there may be minimal application tasks left to execute, for agent 305, therefore all three DB engines (340, 350, and 360) may not be needed. In this instance, the RDS 310 may communicate this with the central coordinator 330, and the central coordinator may command the RDS 310 to release DB engine 360, as it is no longer needed (as indicated by the dotted line).

In this example embodiment, agent 315 may be deployed and may utilize RDS 320. In this example, the central coordinator 330 may assign RDS access to the newly released DB engine 360. Additionally, in this example embodiment, agent 307 may then be deployed and may utilize RDS 310 (which may also be utilized by agent 305). RDS 310 may communicate with the central coordinator 330, and the central coordinator 330 may determine that DB engine 370 is available to access storage 380. The central coordinator 330 may then assign access for RDS 310 to DB engine 370.

Figure 4:
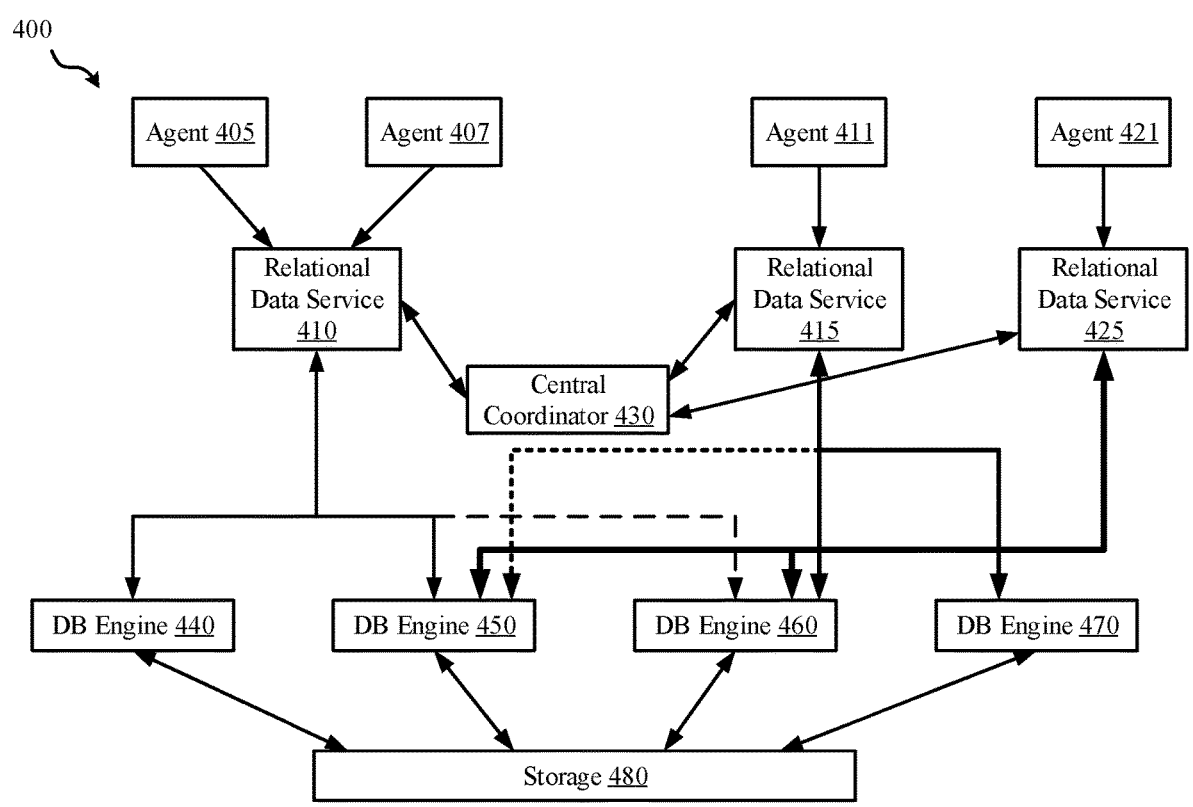
FIG. 4 depicts a schematic diagram of a second example database management system environment, according to some embodiments.

Referring to FIG. 4, a schematic diagram of a second example database management system environment 400 is depicted, according to some embodiments. In some instances, DBMS environment 400 includes four agents 405, 407, 411, and 415. When an application accesses a database, for instance in response to a query submitted by a user, various threads may be used to perform the various application tasks. The agents 405, 407, 411, and 415 may each correspond to a thread. For instance, after a database query is received, various application tasks may be created in order to execute the query, and each task and its corresponding thread may be represented by the agents 405, 407, 411, and 415. In some instances, DBMS environment 400 may include relational database services (RDSs) 410, 415, and 425 to help execute the tasks. In DBMS environment 400, both agents 405 and 407 utilize RDS 410, while agent 411 utilizes RDS 415 and agent 421 utilizes RDS 425.

The DBMS environment 400 also includes a central coordinator 430. In some embodiments, central coordinator 430 may execute methods 100 and 200 (FIGS. 1 and 2, respectively). The central coordinator 430 may create and manage all of the logical segments and their use. In some instances, the central coordinator 430 may initially grant RDS 410 access to database (DB) engines 440, 450, and 460. The DB engines may be the software component that grants access to storage 480, in some instances. Therefore, the RDS 410 (and the corresponding agents 405 and 407) may access data from storage 480 through DB engines 440, 450, and 460 (initially). In an example embodiment, agent 411 and corresponding RDS 415 may subsequently request access (through central coordinator 430) to storage 480. When agent 411 requests access, in this example, DB engine 450 may have additional bandwidth, DB engine 460 may not have much additional bandwidth, and DB engine 470 may be open. Further, in this example, agents 405 and 407 may be almost done with their processing, therefore the remaining logical segments on storage 480 that correspond to agents 405 and 407 may be redistributed to DB engine 440 and 450, and removed from DB engine 460. Therefore, in this example, central coordinator 430 may withdraw RDS 410's access to DB engine 460. Further, central coordinator 430 may grant RDS 415 access to DB engine 450 (as there may be additional bandwidth), DB engine 460, and DB engine 470.

Furthering this example embodiment, agent 421 and corresponding RDS 425 may then request access to storage 480. To redistribute database resource access, the central coordinator may withdraw RDS 415's access to DB engine 450 and may assign RDS 425 access to DB engine 450 and DB engine 460.

Figure 5:
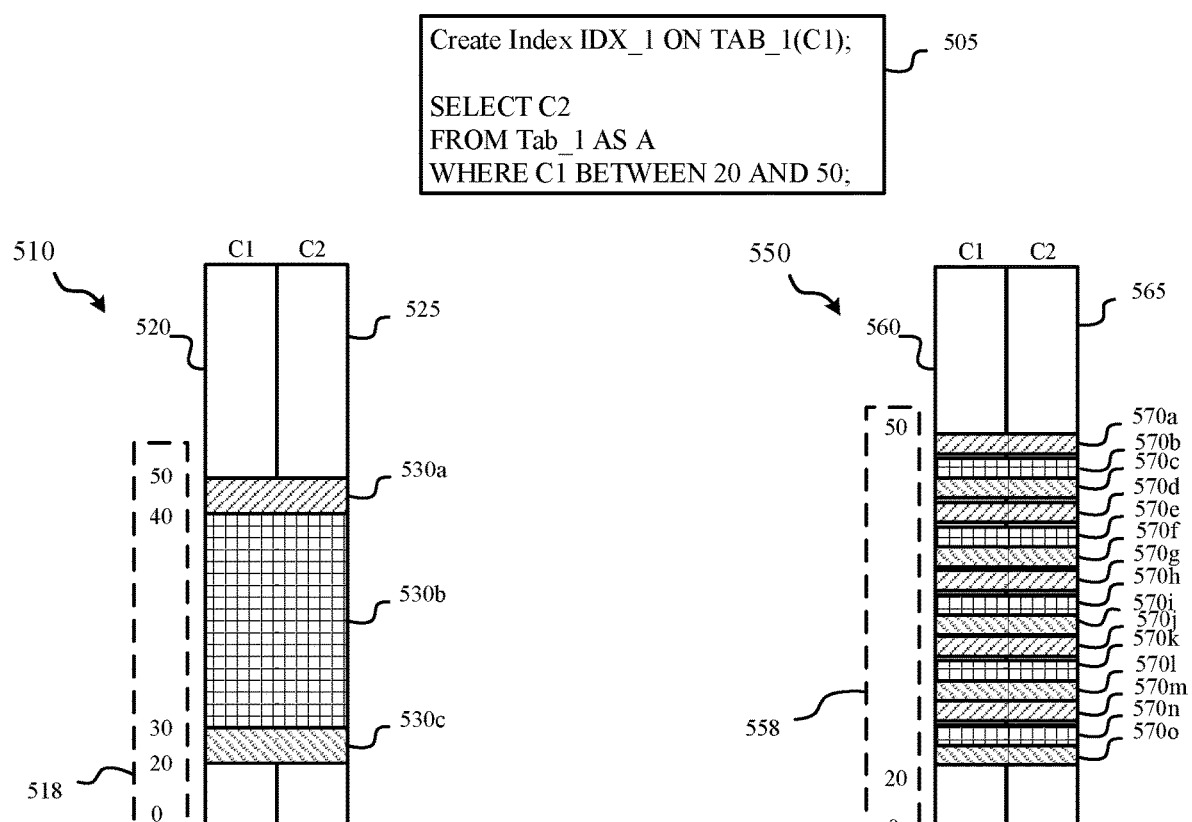
FIG. 5 depicts a schematic diagram of an example division into logical segments for an index scan database access method, according to some embodiments.

Referring to FIG. 5, a schematic diagram of an example conventional division 510 of parallel tasks via partition and an example division 550 into logical segments for an index scan database access method are depicted, according to some embodiments.

In some embodiments, SQL code 505 may indicate that C1 is a first parallel task and C2 is a second parallel task. In this example code 505, C1 may have a key range between 20 and 50. In some instances, in conventional database management systems, the database resources may be divided into partitions such that a database task may only need a specific partition of the database resource, as opposed to the entire resource. For example, in conventional division 510, the key range 518 may be between 20 and 50, therefore a partition may be created between 20 and 30 (530c), between 30 and 40 (530b), and between 40 and 50 (530a). Depictions 520 and 525 may show the various partitions 530a, b, and c for each parallel task C1 (520) and C2 (525). However, as shown in conventional division 510, partition 530b is a large partition. Therefore, if the tasks corresponding to a received database query were processing data within partition 530b, it may take a significant amount of time before the partition 530b is through with its processing. While partition 530b may be processing, other queries and/or other threads may request access to the same database object. However, access may not be granted for the other queries and/or threads until partition 530b is through with processing, in order to prevent errors. Therefore, the other queries and/or threads may need to wait for access to the database object until at least partition 530b is through processing.

In example division 550, the key range may be divided into logical segments. For example division 550, depictions 560 and 565 may show the logical segments for each parallel task C1 (560) and C2 (565). In example division 550, the key range 558 between 20 and 50 is divided into a plurality of small logical segments 570a-o based on a system histogram. These small logical segments 570a-o may represent ranges of, for example, 20-23, 24-27, 27-32, etc. Therefore, each logical segment 570a-o may be small and may not take very long to process. Therefore, if other queries and/or threads request access to a same database object, the system may only need to wait until a single logical segment (e.g., 570a) is processed before redistributing access.

In some instances, redistributing access to a database object may include adjusting which threads are utilized for each database object. For instance, each different pattern (for example, shown in 570a, 570b, and 570c) may correspond to a different task. Therefore, in this example, three different tasks may be used, and they may switch off for each logical segment 570a-o. In an example embodiment, though, the other queries may request access to the database object when logical segment 570k is being processed. In this example, once logical segment 570k has finished, the tasks may be redistributed so only two tasks finish executing logical segments 570l-o (not depicted). This way, the third task may be available for the other queries.

Figure 6:
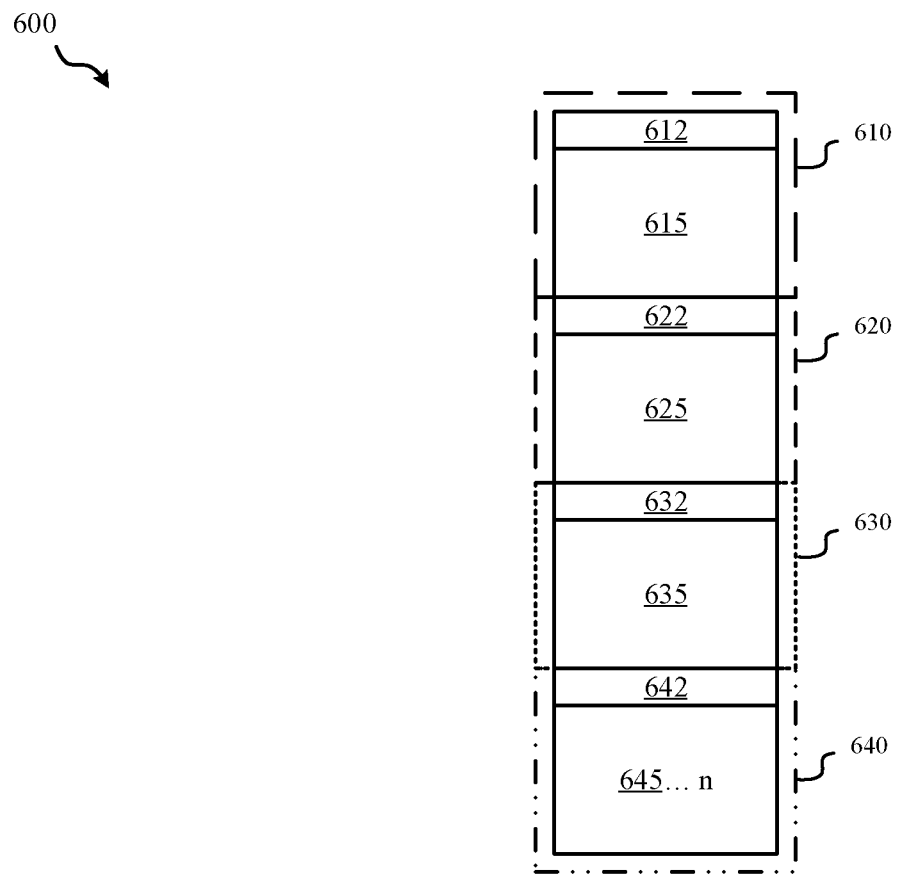
FIG. 6 depicts a block diagram of an example division into logical segments for a table scan database access method, according to some embodiments.

Referring to FIG. 6, a block diagram of an example division 600 into logical segments for a table scan database access method is depicted, according to some embodiments. A table scan access method, as discussed herein, may divide into logical segments using space map page, page size, and sequential prefetch scope. In example division 600, each logical segment 610, 620, 630, and 640 may include a space map page 612, 622, 632, and 642 and a data page 615, 625, 635, and 645 through n, respectively. This way, the table may be broken up into multiple small logical segments that may take a smaller (or even minimal) amount of processing time than the larger logical segments would.

Figure 7:
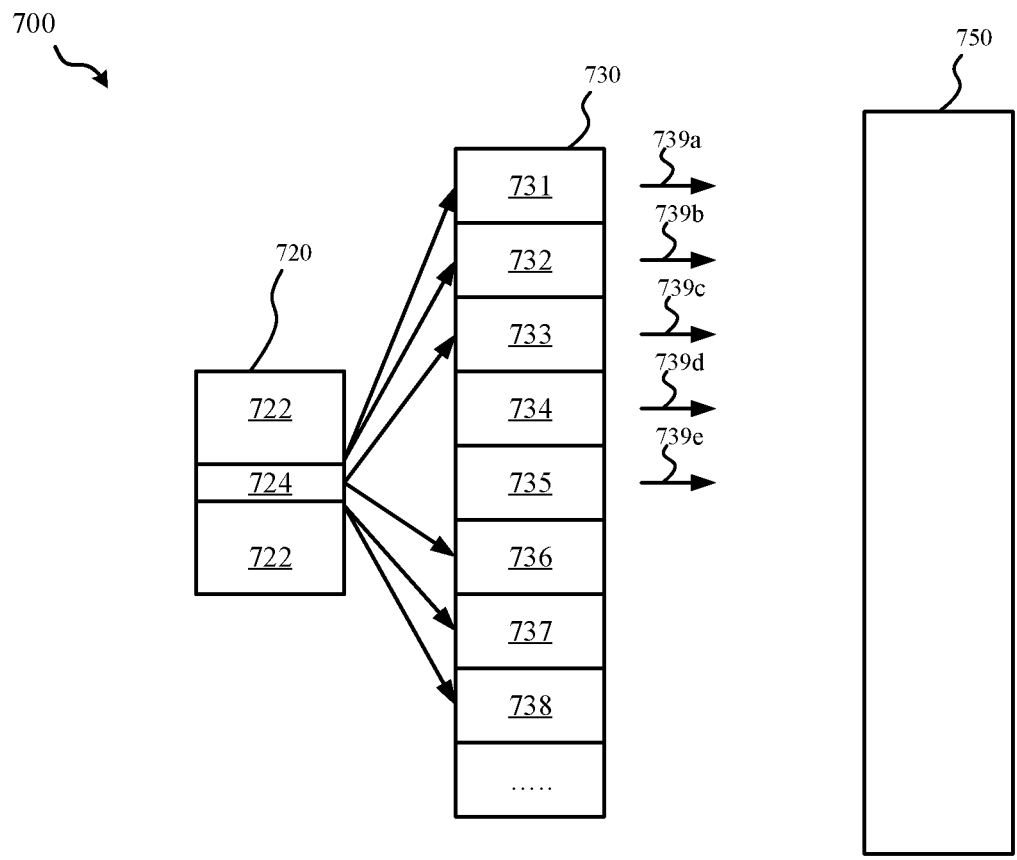
FIG. 7 depicts a schematic diagram of an example division into logical segments for a database join sequence, according to some embodiments.

FIG. 7 depicts a schematic diagram of an example division 700 into logical segments for a database join sequence, according to some embodiments. In some instances, the first object (e.g., table) in the join sequence may be divided into logical segments. However, in some instances, it may be more beneficial to divide a non-leading object (e.g., table) into logical segments. Example division 700 may include a small table 720, medium table 730, and large table 750. In some instances, the join sequence may go from small table 720 to large table 750. Typically, the initial table in the join sequence, which is the small table 720 in this example, may be divided into logical segments. However, in this example, the small table 720 only has two rows 722 and 724, which may be difficult to divide into logical segments. Further, it may be more beneficial to divide table 730 into logical segments, as there are significantly more rows. Therefore, in this example division 700, the non-leading table (the medium table 730) may be divided into logical segments (including logical segments 731-738). The logical segments may extend beyond segment 738, for instance there may be approximately 100,000 rows in table 730. In some embodiments, each row of the 100,000 rows (including rows 731-738) is a logical segment. In example division 700, at least tasks 739a-e may be used to process medium table 730 and join with database 750. Additional tasks may be used for logical segments 736 and up, but for simplicity purposes, they are not depicted. In some embodiments, tasks 739a-e are all different tasks. In some embodiments, similar to a previous example, tasks 739a-e may correspond to two to three tasks. For example, the same task may be recycled, or reused, for tasks 739a and d, and b and e.

Figure 8:
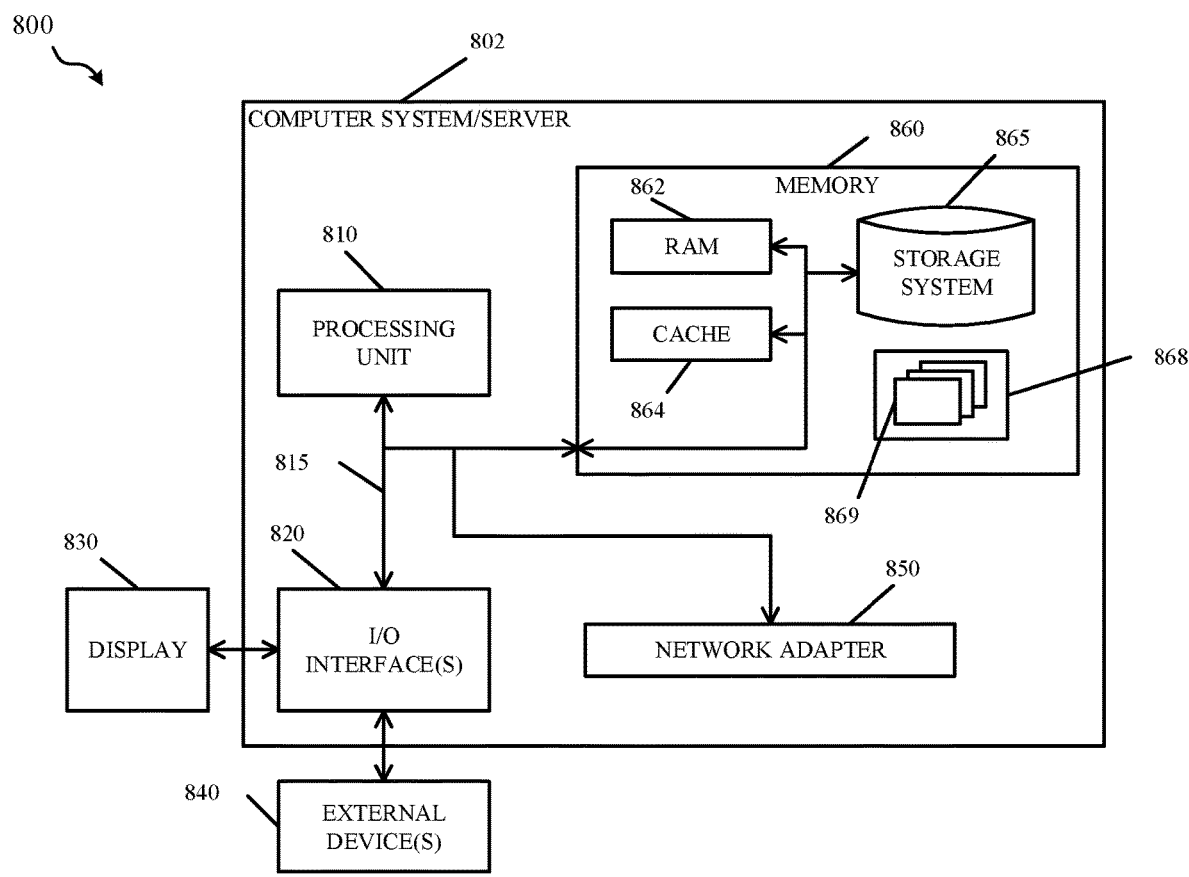
FIG. 8 depicts a block diagram of an example computer system environment, according to some embodiments.

Referring to FIG. 8, computer system 800 is a computer system/server 802 is shown in the form of a general-purpose computing device, according to some embodiments. In some embodiments, computer system/server 802 is located on the linking device. In some embodiments, computer system 802 is connected to the linking device. The components of computer system/server 802 may include, but are not limited to, one or more processors or processing units 810, a system memory 860, and a bus 815 that couples various system components including system memory 860 to processor 810.

Bus 815 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 860 can include computer system readable media in the form of volatile memory, such as random-access memory (RAM) 862 and/or cache memory 864. Computer system/server 802 may further include other removable/non-removable, volatile/non-volatile computer system storage media. By way of example only, storage system 865 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 815 by one or more data media interfaces. As will be further depicted and described below, memory 860 may include at least one program product having a set (e.g., at least one) of program modules that are configured to carry out the functions of embodiments of the disclosure.

Program/utility 868, having a set (at least one) of program modules 869, may be stored in memory 860 by way of example, and not limitation, as well as an operating system, one or more application programs, other program modules, and program data. Each of the operating system, one or more application programs, other program modules, and program data or some combination thereof, may include an implementation of a networking environment. Program modules 869 generally carry out the functions and/or methodologies of embodiments of the invention as described herein.

Computer system/server 802 may also communicate with one or more external devices 840 such as a keyboard, a pointing device, a display 830, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 820. Still yet, computer system/server 802 can communicate with one or more networks such as a local area network (LAN), a general wide area network (WAN), and/or a public network (e.g., the Internet) via network adapter 850. As depicted, network adapter 850 communicates with the other components of computer system/server 802 via bus 815. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
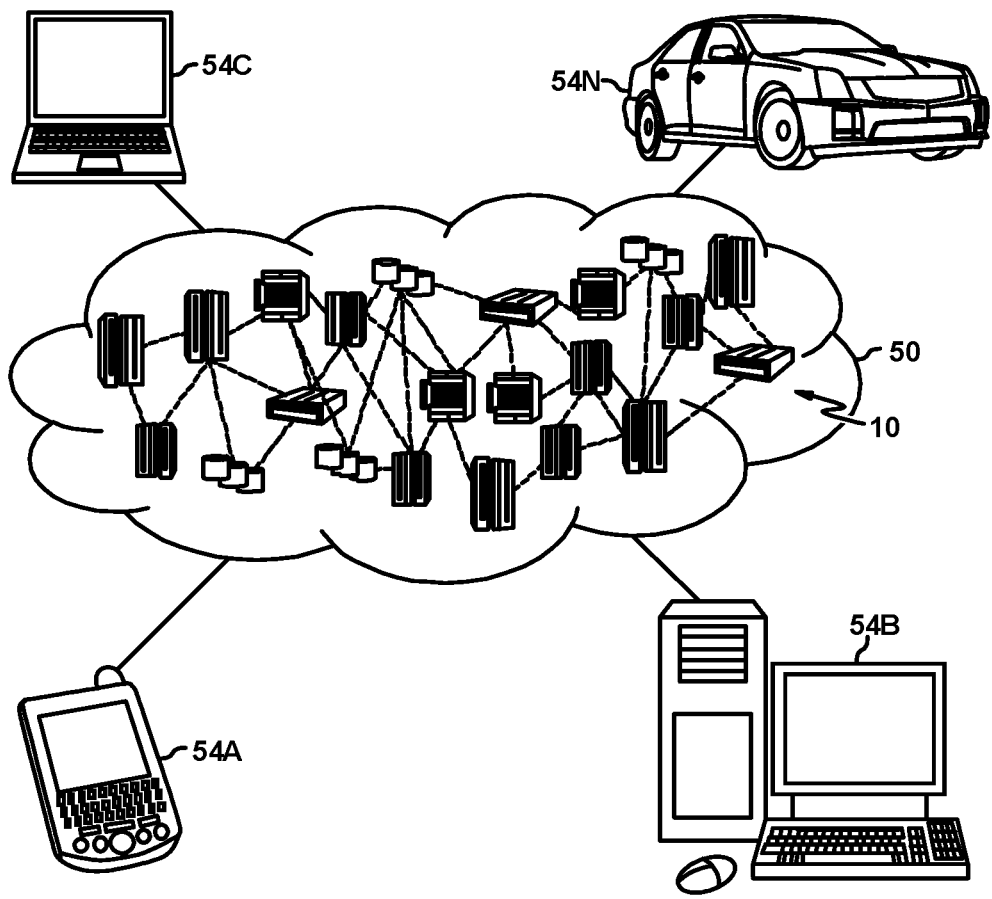
FIG. 9 depicts a cloud computing environment, according to some embodiments.

Referring now to FIG. 9, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
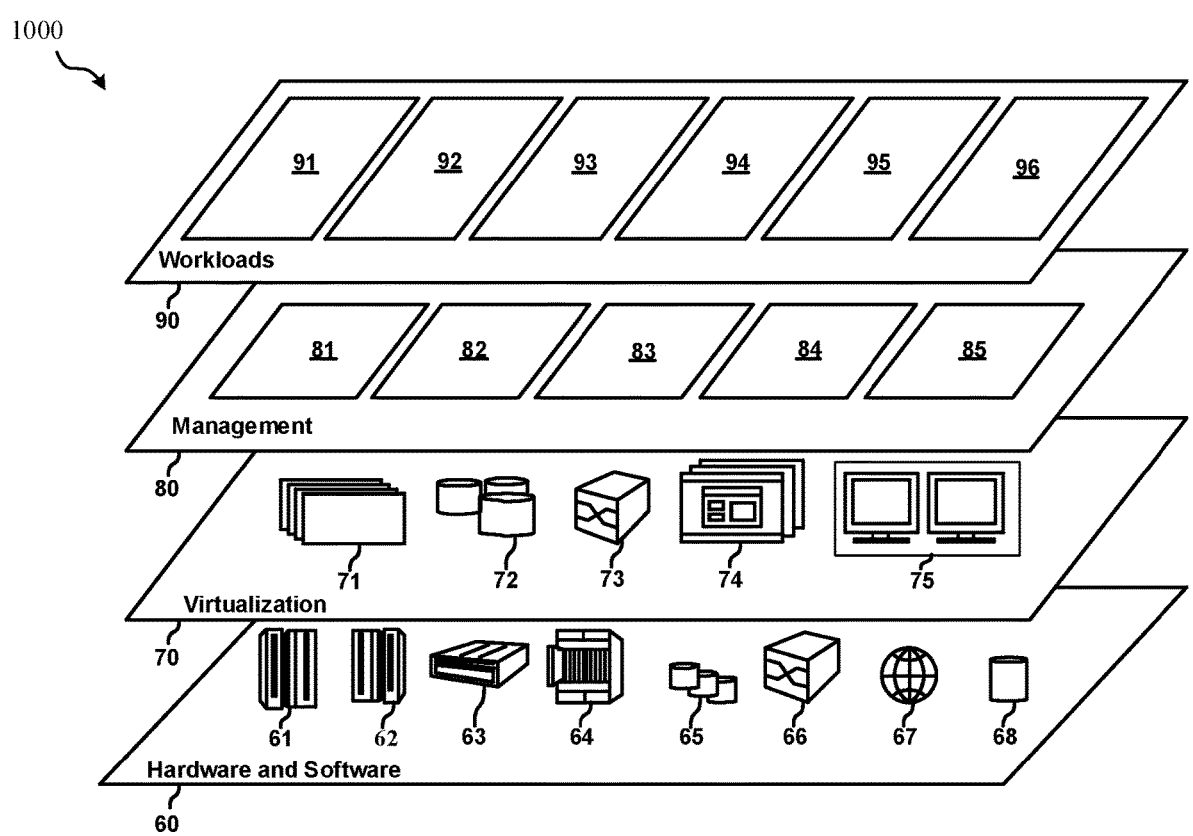
FIG. 10 depicts abstraction model layers, according to some embodiments.

Referring now to FIG. 10, a set of functional abstraction layers 1000 provided by cloud computing environment 50 (FIG. 9) is shown, according to some embodiments. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database management 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   dividing data within a database object within a database resource of a database into a plurality of logical segments based on an index scan comprising index only access and restrictions to database object access, wherein the dividing the data is based on a key-value from a non-leaf page, wherein a first logical segment of the plurality of logical segments comprises a range of data pages that are managed by a space map page, and wherein the space map page is a page that exists in both a table space and an index;

identifying the database object that corresponds to a query for the database;

analyzing the plurality of logical segments of the database object; and dynamically allocating access to the database resource based on the plurality of logical segments of the database object by:

creating a logical segment task map for the database object, wherein the logical segment task map records respective logical segments for the database object, tasks that are scheduled to process the respective logical segments, and indications when the respective logical segments have been processed;

tracking, using the logical segment task map, the tasks for the database object, their corresponding logical segments, and their corresponding processing indications;

in response to determining that the first logical segment from the plurality of logical segments is currently being processed:

waiting for the first logical segment to finish processing;

stopping subsequent second logical segments from being processed;

granting the query for the database resource; and updating the logical segment task map; and in response to determining that the first logical segment is not being processed:

processing the query; and updating the logical segment task map.

2. The method of claim 1, wherein the dividing the data within the database object into the plurality of logical segments is further based on a join method and a join sequence.

3. The method of claim 2, wherein the join method is a nest loop join.

4. The method of claim 2, wherein the join sequence comprises at least a leading table and a non-leading table.

5. A system comprising:

one or more computer processors; and one or more computer-readable storage media collectively storing program instructions, which, when executed by the one or more computer processors, are configured to cause the one or more computer processors to perform computer operations comprising:

divide data within a database object within a database resource of a database into a plurality of logical segments based on an index scan comprising index only access and restrictions to database object access, wherein the dividing the data is based on a key-value from a non-leaf page, wherein a first logical segment of the plurality of logical segments comprises a range of data pages that are managed by a space map page, and wherein the space map page is a page that exists in both a table space and an index;

identify the database object that corresponds to a query for the database;

analyze the plurality of logical segments of the database object; and dynamically allocate access to the database resource based on the plurality of logical segments of the database object by:

creating a logical segment task map for the database object, wherein the logical segment task map records respective logical segments for the database object, tasks that are scheduled to process the respective logical segments, and indications when the respective logical segments have been processed;

tracking, using the logical segment task map, the tasks for the database object, their corresponding logical segments, and their corresponding processing indications;

in response to determining that the first logical segment from the plurality of logical segments is currently being processed:

waiting for the first logical segment to finish processing;

stopping subsequent second logical segments from being processed;

granting the query for the database resource; and updating the logical segment task map; and in response to determining that the first logical segment is not being processed:

processing the query; and updating the logical segment task map.

6. The system of claim 5, wherein the dividing the data within the database object into the plurality of logical segments is further based on a join method and a join sequence.

7. A computer program product comprising a computer readable storage medium having program instructions embodied therewith, the program instructions executable by a server to cause the server to perform a method, the method comprising:

dividing data within a database object within a database resource of a database into a plurality of logical segments based on an index scan comprising index only access and restrictions to database object access, wherein the dividing the data is based on a key-value from a non-leaf page, wherein a first logical segment of the plurality of logical segments comprises a range of data pages that are managed by a space map page, and wherein the space map page is a page that exists in both a table space and an index;

identifying the database object that corresponds to a query for the database;

analyzing the plurality of logical segments of the database object; and dynamically allocating access to the database resource based on the plurality of logical segments of the database object by:

creating a logical segment task map for the database object, wherein the logical segment task map records respective logical segments for the database object, tasks that are scheduled to process the respective logical segments, and indications when the respective logical segments have been processed;

tracking, using the logical segment task map, the tasks for the database object, their corresponding logical segments, and their corresponding processing indications;

in response to determining that the first logical segment from the plurality of logical segments is currently being processed:

waiting for the first logical segment to finish processing;

stopping subsequent second logical segments from being processed;

granting the query for the database resource; and updating the logical segment task map; and in response to determining that the first logical segment is not being processed:
processing the query; and
updating the logical segment task map.

8. The method of claim 2, wherein the join method is a sort merge join.

9. The system of claim 6, wherein the join method is a nest loop join.

10. The system of claim 6, wherein the join method is a sort merge join.

11. The system of claim 6, wherein the join sequence comprises at least a leading table and a non-leading table.

12. The computer program product of claim 7, wherein the dividing the data within the database object into the plurality of logical segments is further based on a join method and a join sequence.

13. The computer program product of claim 12, wherein the join method is a nest loop join.

14. The computer program product of claim 12, wherein the join sequence comprises at least a leading table and a non-leading table.

15. The computer program product of claim 12, wherein the join method is a sort merge join.

\* \* \* \* \*